US006952225B1

(12) United States Patent
Hyodo et al.

(10) Patent No.: US 6,952,225 B1
(45) Date of Patent: Oct. 4, 2005

(54) METHOD AND APPARATUS FOR AUTOMATIC WHITE BALANCE ADJUSTMENT BASED UPON LIGHT SOURCE TYPE

(75) Inventors: Manabu Hyodo, Asaka (JP); Masahiro Konishi, Asaka (JP); Chiaki Ichikawa, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/496,588

(22) Filed: Feb. 2, 2000

(30) Foreign Application Priority Data

Feb. 2, 1999 (JP) .................................. 11-025523

(51) Int. Cl.⁷ ............................................... H04N 9/73
(52) U.S. Cl. .................................................. 348/223.1
(58) Field of Search .................... 348/223.1, 224.1, 348/225.1, 655; 358/516

(56) References Cited

U.S. PATENT DOCUMENTS

| | | | | |
|---|---|---|---|---|
| 4,847,680 A | * | 7/1989 | Okino | 348/224.1 |
| 5,282,022 A | * | 1/1994 | Haruki et al. | 348/223.1 |
| 5,430,482 A | * | 7/1995 | Kim | 348/333.01 |
| 5,481,302 A | * | 1/1996 | Yamamoto et al. | 348/223.1 |
| 5,568,194 A | * | 10/1996 | Abe | 348/223.1 |
| 5,659,357 A | * | 8/1997 | Miyano | 348/223.1 |
| 6,201,932 B1 | * | 3/2001 | Tsujimoto | 396/225 |
| 6,727,942 B1 | * | 4/2004 | Miyano | 348/223.1 |

FOREIGN PATENT DOCUMENTS

JP          564219          12/1993

* cited by examiner

*Primary Examiner*—Wendy R. Garber
*Assistant Examiner*—Timothy J Henn
(74) *Attorney, Agent, or Firm*—Birch Stewart Kolasch & Birch LLP

(57) ABSTRACT

An image-capturing EV is obtained when a shutter button is half pressed, and whether to flash an electronic flash for a subject of low luminance is determined according to the image-capturing EV. If it is determined that the electronic flash should be flashed for the subject of low luminance, a white balance is adjusted according to an electronic flash light. If it is determined that the electronic flash should not be flashed for the subject of low luminance, color information relating to a plurality of areas divided from an entire image plane is acquired, and the number of areas belonging to a shade determination frame, which indicates a color distribution range corresponding to the shade, is found according to the acquired color information. Then, whether a type of the light source is the shade or the daylight is determined according to the obtained image-capturing EV and the number of areas belonging to the shade determination frame. The white balance is adjusted according to the determined type of the light source.

16 Claims, 6 Drawing Sheets

METHOD AND APPARATUS FOR AUTOMATIC WHITE BALANCE ADJUSTMENT BASED UPON LIGHT SOURCE TYPE

BACKGROUND OF THE INVENTION

1. Field of the Invention

This invention relates generally to an automatic white balance adjustment method and apparatus. More particularly, this invention relates to an automatic white balance adjustment method and apparatus for adjusting a white balance according to a type of a light source.

2. Description of Related Art

In a conventional white balance adjustment method, a differential signal (R−B) is calculated between a mean value of R signals and a mean value of B signals among red (R), green (G) and blue (B) signals on the whole image. A white balance is adjusted by adjusting gains of the R signals and the B signals so that the differential signal (R−B) can approach 0. In this method, however, the white balance is not properly adjusted if the color temperature of a subject is distributed unevenly or if major parts of the image have a single color.

In another conventional white balance adjustment method, the range for adjusting the gains of R and B signals is limited according to a luminance level of the subject so that the white balance can be adjusted correctly (Japanese Patent Provisional Publication No. 5-64219). For a scene in which the differential signal (R−B) cannot approach 0, however, this conventional method only just reduces the incorrect adjustment, and the white balance cannot be suitably adjusted by this conventional method that adjusts the white balance so that the differential signal (R−B) can approach 0.

SUMMARY OF THE INVENTION

It is therefore an object of the present invention to provide an automatic white balance adjustment method and apparatus, which correctly determine the type of a light source, and adjusts the white balance according to the determined type of the light source.

The above object can be accomplished by providing an automatic white balance adjustment method comprising the steps of: (a) determining a luminance level of a subject; (b) dividing an image plane, on which the subject is imaged, into a plurality of areas; (c) acquiring color information of each of the areas; (d) setting at least one determination frame indicating at least a color distribution range of a light source; (e) finding a number of the areas belonging to the determination frame in accordance with the color information of each of the areas acquired at step (c); (f) determining a type of a light source with which the subject is illuminated according to the luminance level of the subject determined at step (a) and the number of the areas belonging to the determination frame found at step (e); and (g) adjusting a white balance according to the type of the light source determined at step (f).

According to the present invention, the type of the light source is determined according to the luminance level of the subject and the number of the divided image areas belonging to the determination frame. Then, the white balance is adjusted according to the determined type of the light source by controlling gains of R, G, B signals to the predetermined gains appropriate for the determined type of the light source.

Preferably, the color information comprises a ratio R/G and a ratio B/G between R, G, B signals in each of the areas; and the determination frame is specified by a range of the ratio R/G and a range of the ratio B/G. The determination frame comprises a shade determination frame indicating a color distribution range of a shade; and the area belonging to the shade determination frame is restricted to the area of which luminance is not more than a predetermined luminance. The determination frame comprises a blue sky determination frame indicating a color distribution range of a blue sky; and the area belonging to the blue sky determination frame is restricted to the area of which luminance is not less than a predetermined luminance. In the case of the color temperature is high, it is therefore possible to correctly determine whether the subject is blue due to the shade or the blue sky.

Preferably, the step (f) determining the type of the light source comprises the steps of: calculating an evaluation value expressing how much the subject appears in outdoor shade according to the following equation:

the evaluation value expressing how much the subject appears in outdoor shade=$F(\text{outdoor}) \times F(\text{shade}) \times F(\text{blue sky})$, where F(outdoor) is a value of a membership function of which variable is the luminance level and F(outdoor) expresses how much the subject appears outdoors, F(shade) is a value of a membership function of which variable is the number of the areas belonging to the shade determination frame and F(shade) expresses how much the subject appears in shade, F(blue sky) is a value of a membership function of which variable is the number of the areas belonging to the blue sky determination frame; determining that the type of the light source is outdoor shade when the evaluation value is not less than a predetermined value; and determining that the type of the light source is daylight when the evaluation value is less than the predetermined value.

Preferably, the automatic white balance adjustment method further comprises the step of: determining whether to flash an electronic flash according to the luminance level of the subject determined at step (a), wherein the step (f) is performed only when it is determined not to flash the electronic flash, and the type of the light source is determined as the electronic flash when it is determined to flash the electronic flash.

Preferably, the type of the light source comprises a shade, a fluorescent lamp and an electric bulb; and the determination frames comprises a shade determination frame indicating a color distribution range of a shade, a fluorescent lamp determination frame indicating a color distribution range of a fluorescent lamp, an electric bulb determination frame indicating a color distribution range of an electric bulb, a blue sky determination frame indicating a color distribution range of a blue sky and a skin pigmentation determination frame indicating a color distribution range of a skin pigmentation.

Preferably, the step (f) determining the type of the light source comprises the steps of: calculating an evaluation value expressing how much the subject appears in outdoor shade, an evaluation value expressing how much the light source appears the fluorescent lamp, and an evaluation value expressing how much the light source appears the electric bulb according to the following equations:

the evaluation value expressing how much the subject appears in outdoor shade=$F(\text{outdoor}) \times F(\text{shade}) \times F(\text{blue sky})$;

the evaluation value expressing how much the light source appears the fluorescent lamp=$F_1$(indoor) ×F(fluorescent lamp); and the evaluation value expressing how much the light source appears the electric bulb=$F_2$(indoor)×F(electric bulb)×F(skin pigmentation), where F(outdoor) is a value of a membership function of which variable is the luminance level and F(outdoor) expresses how much the subject appears outdoors, F(shade) is a value of a membership function of which variable is the number of the areas belonging to the shade determination frame and F(shade) expresses how much the subject appears in shade, F(blue sky) is a value of a membership function of which variable is the number of the areas belonging to the blue sky determination frame, $F_1$(indoor) is a value of a membership function of which variable is the luminance level and $F_1$(indoor) expresses how much the subject appears indoors and the light source is the fluorescent lamp, $F_2$(indoor) is a value of a membership function of which variable is the luminance level and $F_2$(indoor) expresses how much the subject appears indoors and the light source is the electric bulb, F(fluorescent lamp) is a value of a membership function of which variable is the numbers of the areas belonging to the fluorescent lamp determination frame and F(fluorescent lamp) expresses how much the light source appears the fluorescent lamp, F(electric bulb) is a value of a membership function of which variable is the numbers of the areas belonging to the electric bulb determination frame and F(electric bulb) expresses how much the light source appears the electric bulb, and F(skin pigmentation) is a value of a membership function of which variable is the numbers of the areas belonging to the skin pigmentation determination frame and F(skin pigmentation) expresses how much the subject appears to include the skin pigmentation; determining, when a maximum one of the evaluation values is not less than a predetermined value, that the type of the light source is as the light source corresponding to the maximum one of the evaluation values; and determining that the type of the light source is daylight when the maximum one of the evaluation values is less than the predetermined value.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
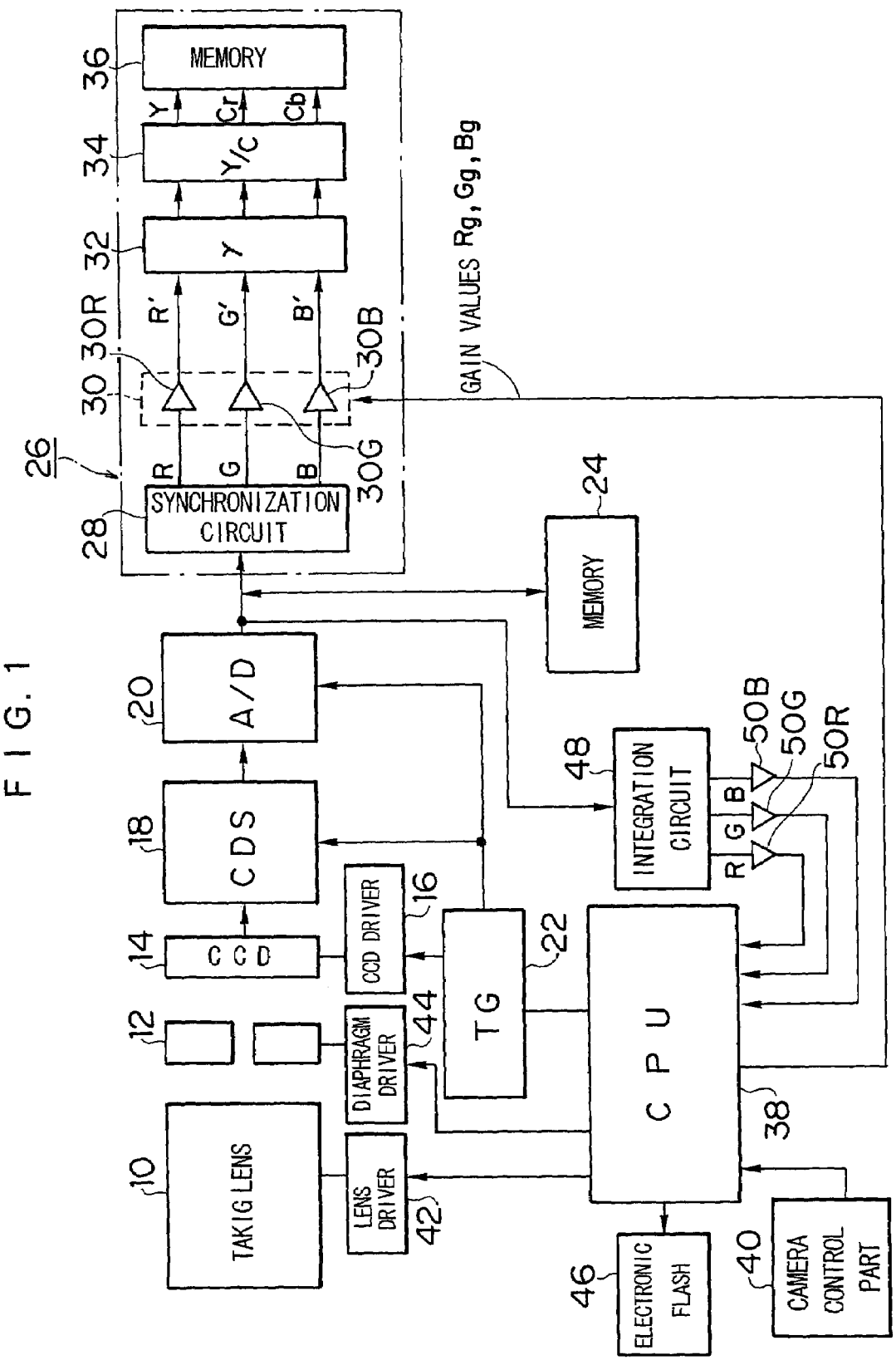
FIG. 1 is a block diagram showing an embodiment of a digital camera, to which an automatic white balance adjustment method and apparatus according to the present invention is applied.

FIG. 1 is a block diagram showing an embodiment of a digital camera, to which an auto-balance adjustment method according to the present invention is applied.

An image of a subject is formed on a light receiving surface of a charge coupled device (CCD) 14 through a taking lens 10 and a diaphragm 12, and is converted into a signal electric charge corresponding to the quantity of incident light in each sensor. The accumulated signal electric charges are read into a shift register by read gate pulses transmitted from a CCD drive circuit 16, and are sequentially read as voltage signals corresponding to the signal electric charges by register transfer pulses. The CCD 14 has a so-called electronic shutter function for discharging the accumulated signal electric charges by shutter gate pulses to control an electric charge accumulation time (a shutter speed).

The voltage signals read sequentially from the CCD 14 are supplied to a correlation double sampling (CDS) circuit 18, which sample-holds R, G and B signals in each pixel. Then, the R, G and B signals are supplied to an A/D converter 20. The A/D converter 20 converts the R, G and B signals, which are fed sequentially from the CDS circuit 18, into digital R, G and B signals of 10 bits (0–1023), and then outputs the converted signals. The CCD drive circuit 16, the CDS circuit 18 and the A/D converter 20 are driven in synchronism with timing signals supplied from a timing generator 22.

The R, G and B signals outputted from the A/D converter 20 are stored in a memory 24, and then, they are supplied from the memory 24 to a digital signal processing circuit 26. The digital signal processing circuit 26 comprises a synchronization circuit 28, a white balance adjustment circuit 30, a gamma correction circuit 32, a YC signal generating circuit 34 and a memory 36.

The synchronization circuit 28 converts the dot-sequential R, G and B signals read from the memory 24 into synchronous signals, and synchronously outputs the R, G and B signals to the white balance adjustment circuit 30. The white balance adjustment circuit 30 comprises multipliers 30R, 30G and 30B for increasing or decreasing digital values of the R, G, B signals. The R, G, B signals are supplied to the multipliers 30R, 30G, 30B, respectively. Gain values Rg, Gg, Bg are also supplied to the multipliers 30R, 30G, 30B, respectively, from a central processing unit (CPU) 38. The multipliers 30R, 30B, 30G multiply the R, G, B signals by the gain values Rg, Gg, Bg to obtain R', G', B' signals with the adjusted white balance, respectively. The obtained R', G', B' signals are outputted to the gamma correction circuit 32. A detailed description will later be given of the gain values Rg, Gg, Bg supplied from the CPU 38 to the white balance adjustment circuit 30.

The gamma correction circuit 32 changes the input/output characteristics to achieve desired gamma characteristics of the white-balance adjusted R', G', B' signals, and changes the 10-bit signals to 8-bit signals which are outputted to the YC signal generating circuit 34. The YC signal generating circuit 34 generates a luminance signal Y and chroma signals Cr, Cb from the gamma-corrected R, G, B signals. The luminance signal Y and the chroma signals Cr, Cb (YC signals) are stored in the memory 36.

The YC signals stored in the memory 36 at the image-capturing are compressed in a predetermined format by a compression circuit (not illustrated), and are recorded in a storage medium such as a memory card.

The CPU 38 controls the circuits in accordance with the inputs from the camera control part 40 including a shutter release button, etc., and performs an automatic focusing, an automatic exposure control, an automatic white balance adjustment, and the like. The auto focusing is, for example, a contrast AF for moving the taking lens 10 so that the high frequency component of the G signal achieves the maximum. When the shutter release button is half pressed, a lens driver 42 moves the taking lens 10 to a focusing position so that the high frequency component of the G signal achieves the maximum.

In the automatic exposure control, a subject luminance (image-capturing EV) is found from an integrated value of R, G, B signals in one frame, and a diaphragm value and a shutter speed are determined according to the image-capturing EV. A diaphragm driver 44 drives the diaphragm 12, and the electronic shutter function controls the electric charge accumulation time to achieve the determined shutter speed. R, G, B signals in one frame are obtained again to find an image-capturing EV again. When the shutter release button is half pressed, the above-described photometry operation is repeated a plurality of times to find a correct image-capturing EV, and the diaphragm value and the shutter speed for the image-capturing are finally determined according to the image-capturing EV. When the shutter release button is fully pressed, the diaphragm driver 44 drives the diaphragm in such a manner as to achieve the determined diaphragm value, and the electronic shutter function controls the electric charge accumulation time in such a manner as to achieve the determined shutter speed.

A description will now be given of the automatic white balance adjustment method.

The digital camera has an electronic flash 46, and has a low luminance automatic flash mode for automatically flashing the electronic flash 46 when the subject luminance is low, a compulsory flash mode for flashing the electronic flash 46 regardless of the subject luminance, a flash prohibition mode for prohibiting the electronic flash 46 from flashing, and the like. The mode is selected by operating an electronic flash key (not illustrated). The white balance is adjusted according to the selected mode.

Referring to a flow chart of FIG. 2, there will be explained the automatic white balance adjustment method in the low luminance automatic flash mode.

If the image-capturing EV is obtained when the shutter release button is half pressed (step S10), whether to flash the electronic flash 46 or not is determined according to the image-capturing EV (step S12). If the image-capturing EV is a predetermined value (10 EV, e.g., an exposure value of 10) or less, it is determined that the electronic flash 46 should be flashed, and the white balance is adjusted according to the electronic flash light (step S14). More specifically, the white balance gain values Rg, Gg, Bg are previously prepared to satisfactorily adjust the white balance according to the electronic flash light, and the gain values Rg, Gg, Bg are supplied to the white balance adjustment circuit 30.

If it is determined that the electronic flash 46 should not be flashed, the entire image plane is divided into a plurality of areas (e.g., 64×64), and average integrated values of R, G, B signals in the respective areas are found to thereby find a ratio R/G between the integrated value of the R signal and the integrated value of the G signal and a ratio B/G between the integrated value of the B signal and the integrated value of the G signal (step S16). An integration circuit 48 in FIG. 1 calculates the average integrated values of the R, G, B signals in each area, and the average integrated values are supplied to the CPU 38. Multipliers 50R, 50G, 50B are provided between the integration circuit 48 and the CPU 38, and adjustment gain values are supplied to the multipliers 50R, 50G, 50B to adjust the unevenness between the multipliers 50R, 50G, SOB.

Figure 4:
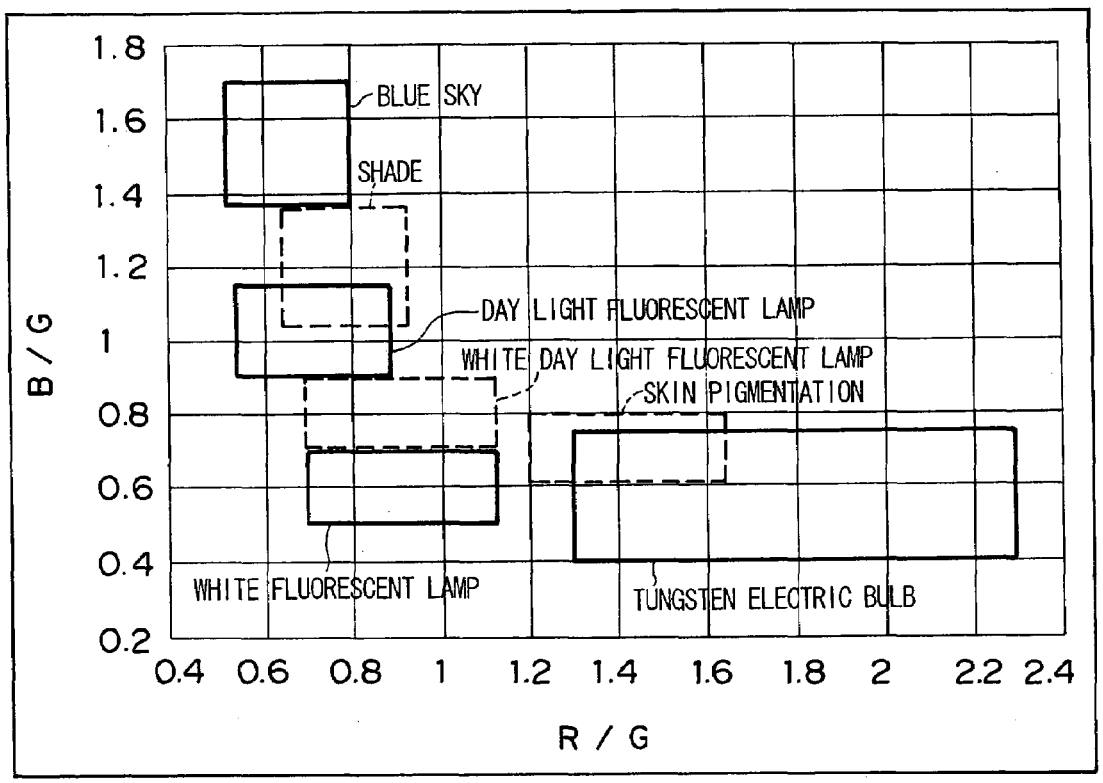
FIG. 4 is a graph showing determination frames indicating the color distribution ranges of various light sources.
Figure 5:
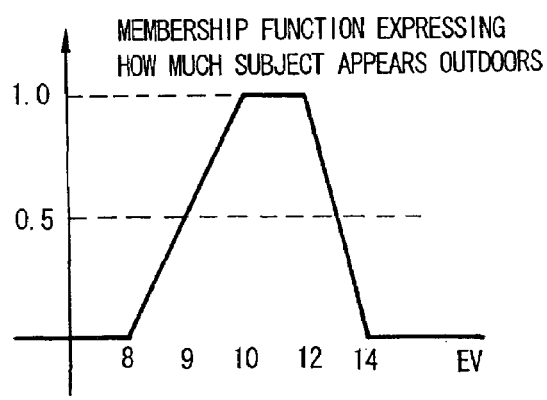
FIG. 5 is a graph showing a membership function expressing how much the subject appears outdoors.
Figure 7:
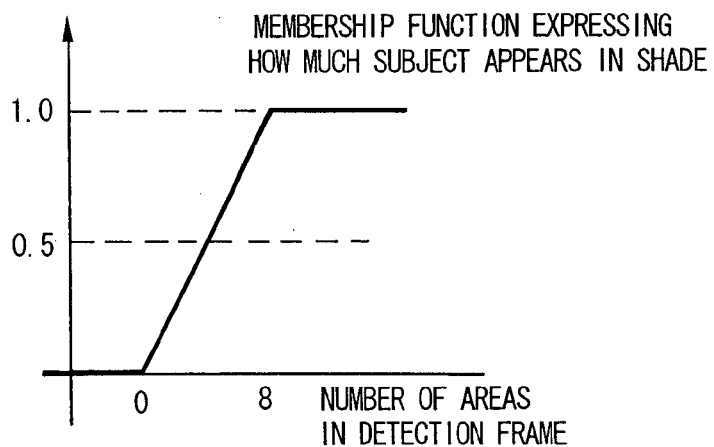
FIG. 7 is a graph showing a membership function expressing how much the subject appears in shade.
Figure 8:
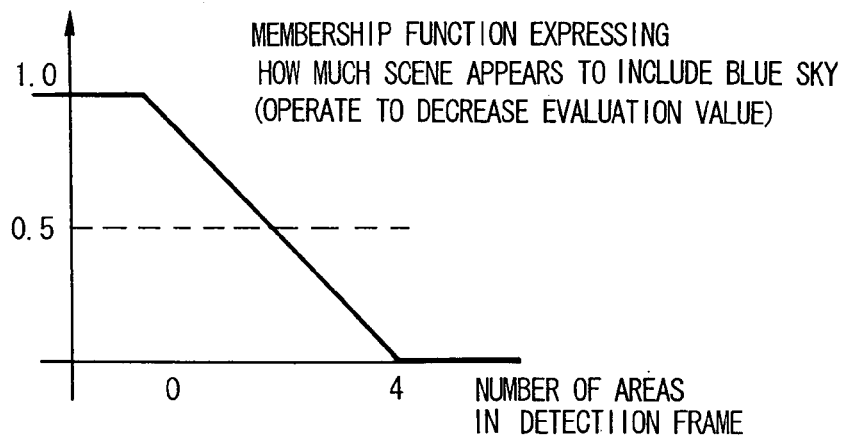
FIG. 8 is a graph showing a membership function expressing how much the scene appears to include a blue sky.

Next, how much the subject appears in outdoor shade or not is determined (step S18). The determination is based on the calculation of an evaluation value as follows:

$$\text{Evaluation value expressing how much the subject appears both outdoors and in shade} = F(\text{outdoor}) \times F(\text{shade}) \times F(\text{blue sky}), \quad (1)$$

where F(outdoor) expresses how much the subject appears outdoors and F(outdoor) is a value of a membership function shown in FIG. 5 of which variable is the image-capturing EV, F(shade) expresses how much the subject appears in shade and F(shade) is a value of a membership function shown in FIG. 7 of which variable is the number of areas of which luminances are less than a predetermined luminance and which are within a shade determination frame in FIG. 4, and F(blue sky) expresses how much the scene appears to include a blue sky and is a value of a membership function shown in FIG. 8 of which variable is the number of areas within a blue sky determination frame in FIG. 4.

The luminance (Evi) in each area is calculated by the following equation:

$$Evi = EV + \log_2(Gi/45), \quad (2)$$

where EV is the image-capturing EV and Gi is an average integrated value of G signals in each area. In this equation, 45 is an optimum value among the converted A/D values.

As shown in FIG. 4, the shade determination frame, the blue sky determination frame, and the like are shown in a graph of which horizontal axis is ratio R/G and vertical axis is ratio B/G, and each determination frame specifies a color distribution of a kind of a light source or the like.

F(shade) is found from the membership function in FIG. 7 on the basis of the number of areas that have Evi, which is calculated by the equation (2), of 12 or less and also have both ratios R/G and B/G belonging to the shade determination frame in FIG. 4. Likewise, F(blue sky) is found from the membership function in FIG. 8 on the basis of the number of areas that have Evi of more than 12.5 and also have both ratios R/G and B/G belonging to the blue sky determination frame in FIG. 4. F(blue sky) operates in such a manner as to decrease the evaluation value expressing how much the subject appears both outdoors and in shade as the number of areas within the blue sky determination frame increases.

Figure 2:
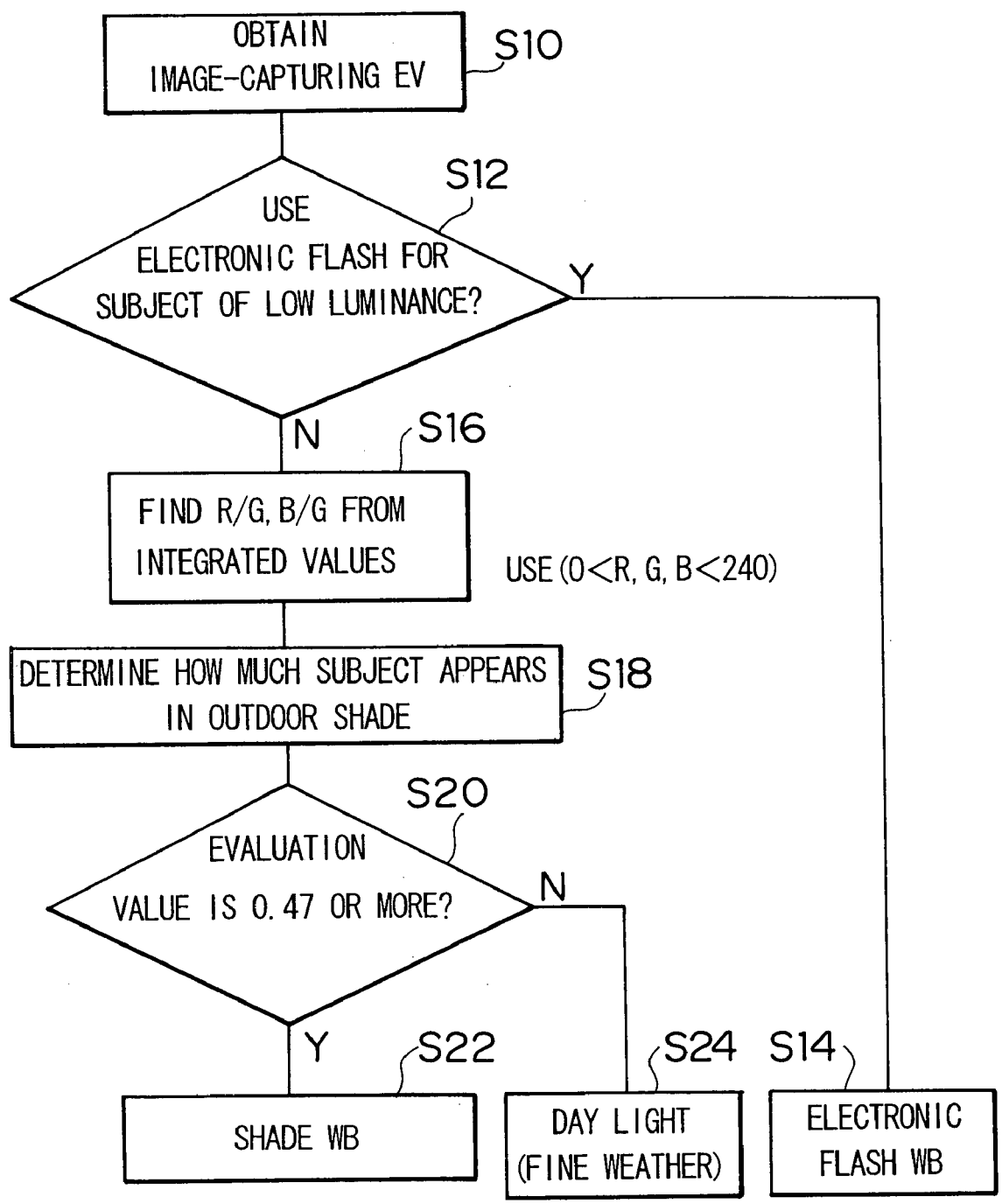
FIG. 2 is a flow chart of assistance in explaining an automatic white balance adjustment method in a low luminance flash mode.

At the step S18 in FIG. 2, the values of the membership function of F(outdoor), F(shade) and F(blue sky) are integrated to find the evaluation value expressing how much the subject appears both outdoors and in shade. At the step S20, it is determined whether or not the evaluation value found at the step S18 is a predetermined reference value (0.47 in this embodiment) or more. If the evaluation value is 0.47 or more, it is determined that the subject is both outdoors and in shade. Accordingly, the white balance is adjusted suitably for the outdoor shade (step S22).

If the evaluation value is less than 0.47, it is determined that the light source is daylight (fair weather), and the white balance is adjusted suitably for the daylight (step S24). The white balance gain values Rg, Gg, Bg are prepared in advance in order to satisfactorily adjust the white balance for the outdoor shade and the daylight. The white balance is adjusted suitably for the outdoor shade and the daylight in such a manner that the appropriate gain values Rg, Gg, Bg are supplied to the white balance adjustment circuit 30.

Referring next to a flow chart in FIG. 3, there will be explained the white balance adjustment method in the flash prohibition mode.

In this case, the image-capturing EV is acquired when the shutter button is half pressed (step S30), and the ratios R/G and B/G are found in 64×64 areas divided from the entire image plane (step S32).

Next, evaluation values expressing how much the light source appears a daylight fluorescent lamp, a white daylight fluorescent lamp, a white light fluorescent lamp or a tungsten electric bulb as well as the evaluation value expressing how much the subject appears both outdoors and in shade are calculated by the following equations (step S34):

Evaluation value expressing how much the light source appears a daylight fluorescent lamp=$F_1$(indoor) ×$F$(daylight fluorescent lamp); (3)

Evaluation value expressing how much the light source appears a white daylight fluorescent lamp=$F_1$(indoor)×$F$(white daylight light fluorescent lamp); (4)

Evaluation value expressing how much the light source appears a white fluorescent lamp=$F_1$(indoor)×$F$(white fluorescent lamp); and (5)

Evaluation value expressing how much the light source appears a tungsten electric bulb=$F_2$(indoor)×$F$(electric bulb)×$F$(skin pigmentation). (6).

Figure 6:
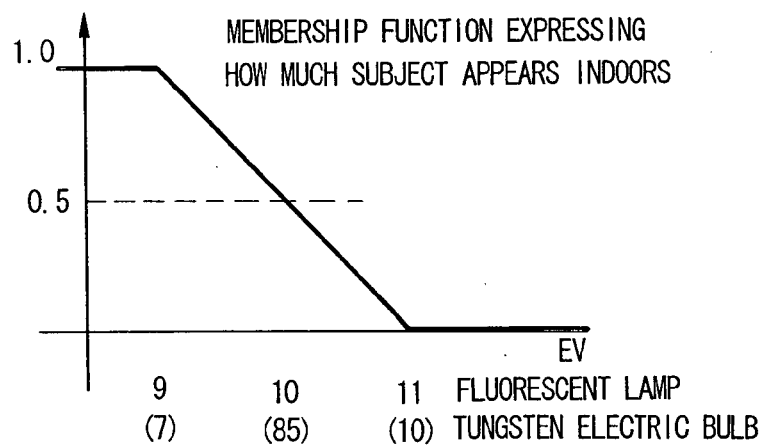
FIG. 6 is a graph showing a membership function expressing how much the subject appears indoors.
Figure 9:
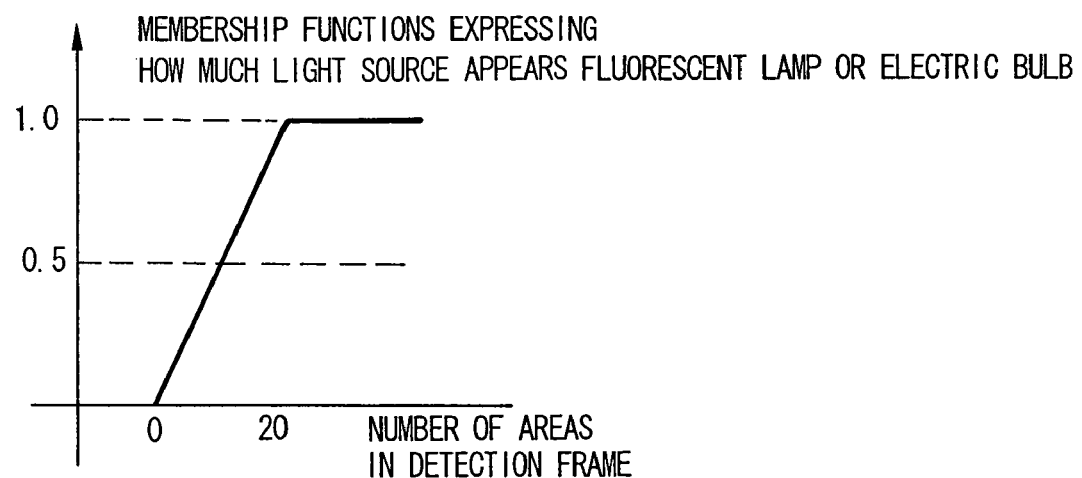
FIG. 9 is a graph showing a membership function expressing how much the light source appears a fluorescent light or an electric bulb.

In the above equations (3)–(5), $F_1$(indoor) expresses how much the subject appears indoors and the light source is the fluorescent lamp, and $F_1$(indoor) is a value of a membership function shown in FIG. 6 of which variable is the image-capturing EV. In the above equation (6), $F_2$(indoor) expresses how much the subject appears indoors and the light source is the tungsten electric bulb, and $F_2$(indoor) is a value of a membership function shown in FIG. 6 of which variable is the image-capturing EV that are in parentheses in FIG. 6. In the above equations (3)–(6), F(daylight fluorescent lamp), F(white daylight fluorescent lamp), F(white fluorescent lamp) and F(electric bulb) express how much the light source appears the daylight fluorescent lamp, the white daylight fluorescent lamp, the white fluorescent lamp and the tungsten electric bulb, respectively. F(daylight fluorescent lamp), F(white daylight fluorescent lamp), F(white fluorescent lamp) and F(electric bulb) are values of membership functions shown in FIG. 9 of which variables are the numbers of areas within a daylight fluorescent lamp determination frame, a white daylight fluorescent lamp determination frame, a white fluorescent lamp determination frame and a tungsten electric bulb determination frame, respectively, in FIG. 4.

Figure 10:
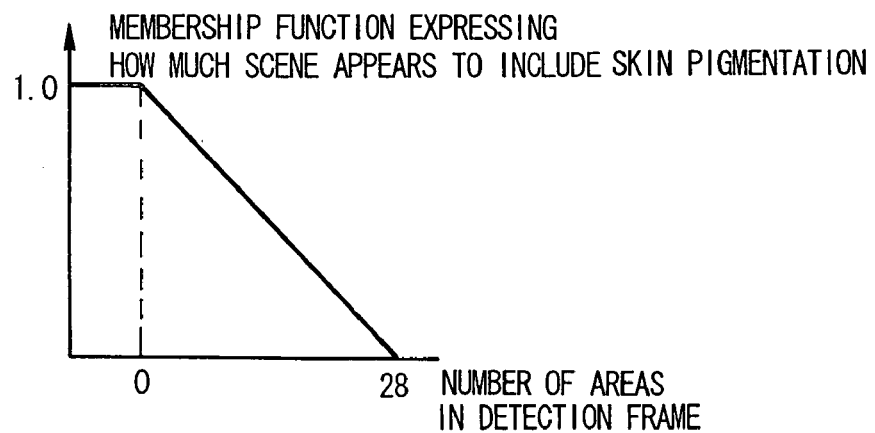
FIG. 10 is a graph showing a membership function of a skin pigmentation.

In the above equation (6), F(skin pigmentation) expresses how much the subject appears to include a skin pigmentation and is a value of a membership function shown in FIG. 10 of which variable is the number of areas belonging to a skin pigmentation determination frame in FIG. 4. F(skin pigmentation) operates in such a manner as to lower the evaluation value expressing how much the light source appears the electric bulb as the number of areas within the skin pigmentation determination frame increases. This is because a red tinge disappears and people turn pale if the white balance is adjusted intensively with respect to the tungsten electric bulb for the subject including the skin pigmentation.

Figure 3:
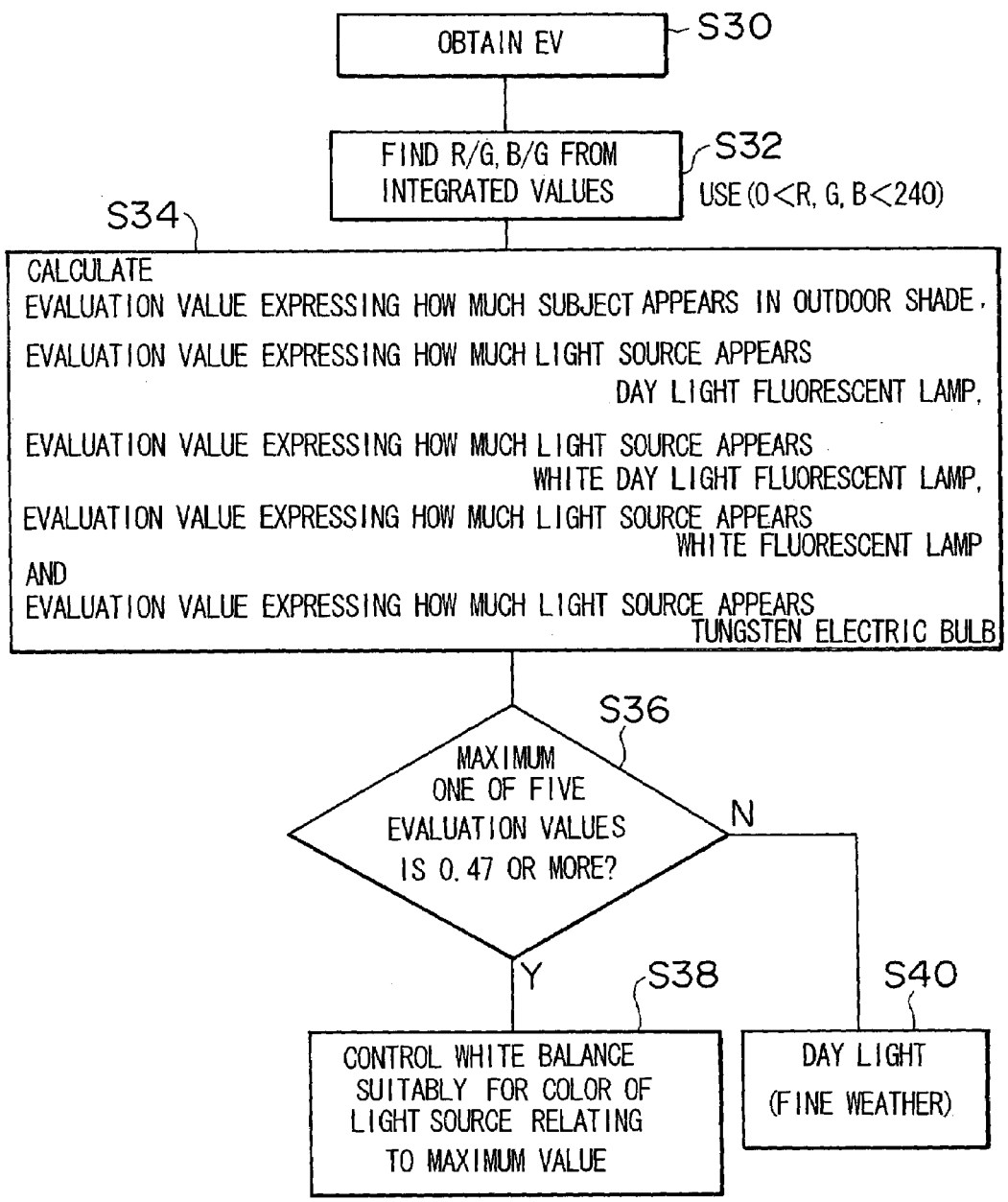
FIG. 3 is a flow chart of assistance in explaining an automatic white balance adjustment method in a flash prohibition mode.

When the evaluation value how much the subject appears both outdoors and in shade (see the equation (1)), the evaluation value how much the light source appears the daylight fluorescent lamp, the evaluation value how much the light source appears the white daylight fluorescent lamp, the evaluation value how much the light source appears the white fluorescent lamp and the evaluation value how much the light source appears the electric bulb are calculated, it is determined whether or not the value of the maximum one of these five evaluation values is 0.47 or more (step S36 in FIG. 3). If the maximum value is 0.47 or more, the white balance is adjusted according to the color of the light source corresponding to the maximum evaluation value (step S38).

If the maximum evaluation value is less than 0.47, it is determined that the light source is the daylight, and the white balance is adjusted suitably for the daylight (step S40).

In order to satisfactorily adjust the white balance suitably for the outdoor shade, the daylight fluorescent lamp, the white daylight fluorescent lamp, the white fluorescent lamp, the tungsten electric bulb and the daylight, the white balance gain values Rg, Gg, Bg are prepared in advance, and the appropriate gain values Rg, Gg, Bg are supplied to the white balance adjustment circuit 30.

More specifically, the white balance adjustment circuit 30 obtains the corrected signals R', G', B' as follows:

$R'=Rg \times R;$ (7)

$G'=Gg \times G;$ and (8)

$B'=Bg \times B$ (9)

where Rg, Gg, Bg are the preset gain values, and R, G, B are the signals to be corrected.

The gain values may be changed according to the degree of the scene (the evaluation value) as shown in the following equations:

$R'=\{(Rg-1)\times(\text{evaluation value})+1\}\times R;$ (10)

$G'=\{(Gg-1)\times(\text{evaluation value})+1\}\times G;$ and (11)

$B'=\{(Bg-1)\times(\text{evaluation value})+1\}\times B.$ (12)

The preset gain values Rg, Gg, Bg for the different types of light sources are empirically set within the range between 0.9 and 1.5. If the gain values are changed according to the evaluation value, the continuity of the scenes is maintained.

In this embodiment, the evaluation values for determining the type of the light source are calculated by the equations (1), (3)–(6), but the evaluation values may also be calculated by taking one or more other factors (other membership functions) into account. The types of the light sources should not be restricted to this embodiment; for example, only one or two kinds of fluorescent lamps may be determined.

As set forth hereinabove, according to the present invention, the type of to the light source is determined correctly, so that the white balance can be satisfactorily adjusted according to the type of the light source.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An automatic white balance adjustment method, comprising the steps of:
   (a) determining a luminance level of a subject;
   (b) dividing an image plane, on which the subject is imaged, into a plurality of areas;
   (c) acquiring color information of each of the areas;
   (d) setting at least one determination frame indicating at least a color distribution range of a light source;
   (e) finding a number of the areas belonging to the determination frame in accordance with the color information of each of the areas acquired at step (c);
   (f) determining a type of a light source with which the subject is illuminated according to the luminance level of the subject determined at step (a) and the number of the areas belonging to the determination frame found at step (e); and
   (g) adjusting a white balance according to the type of the light source determined at step (f).

2. The automatic white balance adjustment method as defined in claim 1, wherein:
   the color information comprises a ratio R/G and a ratio B/G between R, G, B signals in each of the areas; and
   the determination frame is specified by a range of the ratio R/G and a range of the ratio B/G.

3. An automatic white balance adjustment method, comprising the steps of:
   (a) determining a luminance level of a subject;
   (b) dividing an image plane, on which the subject is imaged, into a plurality of areas;
   (c) acquiring color information of each of the areas;
   (d) setting at least one determination frame indicating at least a color distribution range of a light source;
   (e) finding a number of the areas belonging to the determination frame in accordance with the color information of each of the areas acquired at step (c);
   (f) determining a type of a light source with which the subject is illuminated according to the luminance level of the subject determined at step (a) and the number of the areas belonging to the determination frame found at step (e); and
   (g) adjusting a white balance according to the type of the light source determined at step (f), wherein
      the determination frame comprises a shade determination frame indicating a color distribution range of a shade; and
      the area belonging to the shade determination frame is restricted to the area of which luminance is not more than a predetermined luminance.

4. The automatic white adjustment method as defined in claim 3, wherein:
   the determination frame comprises a blue sky determination frame indicating a color distribution range of a blue sky; and
   the area belonging to the blue sky determination frame is restricted to the area of which luminance is not less than a predetermined luminance.

5. The automatic white balance adjustment method as defined in claim 4, wherein the step (f) comprises the steps of:
   calculating an evaluation value expressing how much the subject appears in outdoor shade according to the following equation:
   the evaluation value expressing how much the subject appears in outdoor shade=F(outdoor)×F(shade)×F(blue sky), where F(outdoor) is a value of a membership function of which variable is the luminance level and F(outdoor) expresses how much the subject appears outdoors, F(shade) is a value of a membership function of which variable is the number of the areas belonging to the shade determination frame and F(shade) expresses how much the subject appears in shade, F(blue sky) is a value of a membership function of which variable is the number of the areas belonging to the blue sky determination frame;
   determining that the type of the light source is outdoor shade when the evaluation value is not less than a predetermined value; and
   determining that the type of the light source is daylight when the evaluation value is less than the predetermined value.

6. The automatic white balance adjustment method as defined in claim 5, further comprising the step of:
   determining whether to flash an electronic flash according to the luminance level of the subject determined at step (a),
   wherein the step (f) is performed only when it is determined not to flash the electronic flash, and the type of the light source is determined as the electronic flash when it is determined to flash the electronic flash.

7. An automatic white balance adjustment method, comprising the steps of:
   (a) determining a luminance level of a subject;
   (b) dividing an image plane, on which the subject is imaged, into a plurality of areas;
   (c) acquiring color information of each of the areas;
   (d) setting at least one determination frame indicating at least a color distribution range of a light source;
   (e) finding a number of the areas belonging to the determination frame in accordance with the color information of each of the areas acquired at step (c);
   (f) determining a type of a light source with which the subject is illuminated according to the luminance level of the subject determined at step (a) and the number of the areas belonging to the determination frame found at step (e); and
   (g) adjusting a white balance according to the type of the light source determined at step (f), wherein
      the type of the light source comprises a shade, a fluorescent lamp and an electric bulb; and
      the determination frames comprises a shade determination frame indicating a color distribution range of a shade, a fluorescent lamp determination frame indicating a color distribution range of a fluorescent lamp, an electric bulb determination frame indicating a color distribution range of an electric bulb, a blue sky determination frame indicating a color distribution range of a blue sky and a skin pigmentation determination frame indicating a color distribution range of a skin pigmentation.

8. The automatic white balance adjustment method as defined in claim 7, wherein the step (f) comprises the steps of:
   calculating an evaluation value expressing how much the subject appears in outdoor shade, an evaluation value expressing how much the light source appears the fluorescent lamp, and an evaluation value expressing how much the light source appears the electric bulb according to the following equations:

the evaluation value expressing how much the subject appears in outdoor shade=F(outdoor)×F(shade)×F(blue sky);

the evaluation value expressing how much the light source appears the fluorescent lamp=$F_1$(indoor)×F(fluorescent lamp); and the evaluation value expressing how much the light source appears the electric bulb=$F_2$(indoor)×F(electric bulb)×F(skin pigmentation), where F(outdoor) is a value of a membership function of which variable is the luminance level and F(outdoor) expresses how much the subject appears outdoors, F(shade) is a value of a membership function of which variable is the number of the areas belonging to the shade determination frame and F(shade) expresses how much the subject appears in shade, F(blue sky) is a value of a membership function of which variable is the number of the areas belonging to the blue sky determination frame, $F_1$(indoor) is a value of a membership function of which variable is the luminance level and $F_1$(indoor) expresses how much the subject appears indoors and the light source is the fluorescent lamp, $F_2$(indoor) is a value of a membership function of which variable is the luminance level and $F_2$(indoor) expresses how much the subject appears indoors and the light source is the electric bulb, F(fluorescent lamp) is a value of a membership function of which variable is the numbers of the areas belonging to the fluorescent lamp determination frame and F(fluorescent lamp) expresses how much the light source appears the fluorescent lamp, F(electric bulb) is a value of a membership function of which variable is the numbers of the areas belonging to the electric bulb determination frame and F(electric bulb) expresses how much the light source appears the electric bulb, and F(skin pigmentation) is a value of a membership function of which variable is the numbers of the areas belonging to the skin pigmentation determination frame and F(skin pigmentation) expresses how much the subject appears to include the skin pigmentation;

determining, when a maximum one of the evaluation values is not less than a predetermined value, that the type of the light source is as the light source corresponding to the maximum one of the evaluation values; and determining that the type of the light source is daylight when the maximum one of the evaluation values is less than the predetermined value.

9. An automatic white balance adjustment apparatus, comprising:

a luminance level determining device that determines a luminance level of a subject;

an image plane dividing device that divides an image plane, on which the subject is imaged, into a plurality of areas;

a color information acquiring device that acquires color information of each of the areas;

a determination frame setting device that sets at least one determination frame indicating at least a color distribution range of a light source;

a number of areas finding device that finds a number of the areas belonging to the determination frame in accordance with the color information of each of the areas acquired by the color information acquiring device;

a light source type determining device that determines a type of a light source with which the subject is illuminated according to the luminance level of the subject determined by the luminance level determining device and the number of the areas belonging to the determination frame found by the number of areas finding device; and a white balance adjusting device that adjusts a white balance according to the type of the light source determined by the light source type determining device.

10. The automatic white balance adjustment apparatus as defined in claim 9, wherein:

the color information comprises a ratio R/G and a ratio B/G between R, G, B signals in each of the areas; and the determination frame is specified by a range of the ratio R/G and a range of the ratio B/G.

11. An automatic white balance adjustment apparatus, comprising:

a luminance level determining device that determines a luminance level of a subject;

an image plane dividing device that divides an image plane, on which the subject is imaged, into a plurality of areas;

a color information acquiring device that acquires color information of each of the areas;

a determination frame setting device that sets at least one determination frame indicating at least a color distribution range of a light source;

a number of areas finding device that finds a number of the areas belonging to the determination frame in accordance with the color information of each of the areas acquired by the color information acquiring device;

a light source type determining device that determines a type of a light source with which the subject is illuminated according to the luminance level of the subject determined by the luminance level determining device and the number of the areas belonging to the determination frame found by the number of areas finding device; and a white balance adjusting device that adjusts a white balance according to the type of the light source determined by the light source type determining device, wherein the determination frame comprises a shade determination frame indicating a color distribution range of a shade; and the area belonging to the shade determination frame is restricted to the area of which luminance is not more than a predetermined luminance.

12. The automatic white adjustment apparatus as defined in claim 11, wherein:

the determination frame comprises a blue sky determination frame indicating a color distribution range of a blue sky; and the area belonging to the blue sky determination frame is restricted to the area of which luminance is not less than a predetermined luminance.

13. The automatic white balance adjustment apparatus as defined in claim 12, wherein:

the light source type determining device comprises an evaluation value calculating device that calculates an evaluation value expressing how much the subject appears in outdoor shade according to the following equation:

the evaluation value expressing how much the subject appears in outdoor shade=F(outdoor)×F(shade)×F(blue sky), where F(outdoor) is a value of a membership function of which variable is the luminance level and F(outdoor) expresses how much the subject appears outdoors, F(shade) is a value of a membership function of which variable is the number of the areas belonging to the shade determination frame and F(shade) expresses how much the subject appears in shade, F(blue sky) is a value of a membership function of which variable is the number of the areas belonging to the blue sky determination frame;

the light source type determining device determines that the type of the light source is outdoor shade when the evaluation value is not less than a predetermined value; and the light source type determining device determines that the type of the light source is daylight when the evaluation value is less than the predetermined value.

14. The automatic white balance adjustment apparatus as defined in claim 13, further comprising:

an electronic flash controlling device that determines whether to flash an electronic flash according to the luminance level of the subject determined by the luminance level determining device, wherein the light source type determining device operates only when it is determined not to flash the electronic flash, and the type of the light source is determined as the electronic flash when it is determined to flash the electronic flash.

15. An automatic white balance adjustment apparatus, comprising:

a luminance level determining device that determines a luminance level of a subject;

an image plane dividing device that divides an image plane, on which the subject is imaged, into a plurality of areas;

a color information acquiring device that acquires color information of each of the areas;

a determination frame setting device that sets at least one determination frame indicating at least a color distribution range of a light source;

a number of areas finding device that finds a number of the areas belonging to the determination frame in accordance with the color information of each of the areas acquired by the color information acquiring device;

a light source type determining device that determines a type of a light source with which the subject is illuminated according to the luminance level of the subject determined by the luminance level determining device and the number of the areas belonging to the determination frame found by the number of areas finding device; and a white balance adjusting device that adjusts a white balance according to the type of the light source determined by the light source type determining device, wherein the type of the light source comprises a shade, a fluorescent lamp and an electric bulb; and the determination frames comprises a shade determination frame indicating a color distribution range of a shade, a fluorescent lamp determination frame indicating a color distribution range of a fluorescent lamp, an electric bulb determination frame indicating a color distribution range of an electric bulb, a blue sky determination frame indicating a color distribution range of a blue sky and a skin pigmentation determination frame indicating a color distribution range of a skin pigmentation.

16. The automatic white balance adjustment apparatus as defined in claim 15, wherein:

the light source type determining device comprises an evaluation value calculating device that calculates an evaluation value expressing how much the subject appears in outdoor shade, an evaluation value expressing how much the light source appears the fluorescent lamp, and an evaluation value expressing how much the light source appears the electric bulb according to the following equations:

the evaluation value expressing how much the subject appears in outdoor shade=$F$(outdoor)×$F$(shade)×$F$(blue sky);

the evaluation value expressing how much the light source appears the fluorescent lamp=$F_1$(indoor)×$F$(fluorescent lamp); and the evaluation value expressing how much the light source appears the electric bulb=$F_2$(indoor)×$F$(electric bulb)×$F$(skin pigmentation), where F(outdoor) is a value of a membership function of which variable is the luminance level and F(outdoor) expresses how much the subject appears outdoors, F(shade) is a value of a membership function of which variable is the number of the areas belonging to the shade determination frame and F(shade) expresses how much the subject appears in shade, F(blue sky) is a value of a membership function of which variable is the number of the areas belonging to the blue sky determination frame, $F_1$ (indoor) is a value of a membership function of which variable is the luminance level and $F_1$(indoor) expresses how much the subject appears indoors and the light source is the fluorescent lamp, $F_2$(indoor) is a value of a membership function of which variable is the luminance level and $F_2$(indoor) expresses how much the subject appears indoors and the light source is the electric bulb, F(fluorescent lamp) is a value of a membership function of which variable is the numbers of the areas belonging to the fluorescent lamp determination frame and F(fluorescent lamp) expresses how much the light source appears the fluorescent lamp, F(electric bulb) is a value of a membership function of which variable is the numbers of the areas belonging to the electric bulb determination frame and F(electric bulb) expresses how much the light source appears the electric bulb, and F(skin pigmentation) is a value of a membership function of which variable is the numbers of the areas belonging to the skin pigmentation determination frame and F(skin pigmentation) expresses how much the subject appears to include the skin pigmentation;

the light source type determining device determines, when a maximum one of the evaluation values is not less than a predetermined value, that the type of the light source is as the light source corresponding to the maximum one of the evaluation values; and the light source type determining device determines that the type of the light source is daylight when the maximum one of the evaluation values is less than the predetermined value.

* * * * *